(12) United States Patent
Ingistov

(10) Patent No.: US 6,609,888 B1
(45) Date of Patent: Aug. 26, 2003

(54) METHOD AND APPARATUS FOR REDUCING CONTAMINATION IN AN AXIAL COMPRESSOR

(75) Inventor: Steve Ingistov, Los Angeles, CA (US)

(73) Assignee: Watson Cogeneration Company, Carson, CA (US)

( * ) Notice: Subject to any disclaimer, the term of this patent is extended or adjusted under 35 U.S.C. 154(b) by 0 days.

(21) Appl. No.: 09/631,512

(22) Filed: Aug. 3, 2000

Related U.S. Application Data

(63) Continuation-in-part of application No. 09/557,280, filed on Apr. 24, 2000, now abandoned.
(51) Int. Cl.$^7$ .......................... F01D 11/00; F01D 11/02
(52) U.S. Cl. ....................... 415/231; 415/113
(58) Field of Search ................ 415/111–113, 170.1, 415/174.2, 174.5, 230, 231, 175, 176; 277/355, 418–420, 350; 304/151

(56) References Cited

U.S. PATENT DOCUMENTS

| | | | | |
|---|---|---|---|---|
| 2,281,905 A | * | 5/1942 | Young | 277/420 |
| 2,878,048 A | * | 3/1959 | Peterson | 277/355 |
| 4,403,779 A | * | 9/1983 | Wilkinson | 277/355 |
| 4,497,172 A | * | 2/1985 | Smith | 277/355 |
| 4,755,103 A | * | 7/1988 | Streifinger | 415/111 |
| 5,190,440 A | * | 3/1993 | Maier et al. | 415/174.5 |
| 5,613,829 A | * | 3/1997 | Wolfe et al. | 415/174.2 |
| 5,630,590 A | * | 5/1997 | Bouchard et al. | 415/230 |
| 5,799,952 A | * | 9/1998 | Morrison et al. | 277/355 |
| 5,961,279 A | * | 10/1999 | Ingistov | 415/170.1 |
| 6,139,018 A | * | 10/2000 | Cromer et al. | 277/355 |
| 6,173,962 B1 | * | 1/2001 | Morrison et al. | 277/355 |
| 6,226,975 B1 | * | 5/2001 | Ingistov | 415/170.1 |
| 6,261,057 B1 | * | 7/2001 | Turnquist et al. | 415/174.2 |

OTHER PUBLICATIONS

"Gas Turbine Compressor Washing State Of The Art—Field Experiences," Jean–Pierre Stalder, The American Society of Mechanical Engineers, 345 E. 47$^{th}$ St., New York, N.Y. 10017, 98–GT–420, presented at the International Gas Turbine & Aeroengine Congress & Exhibition in Stockholm Sweden, Jun. 2–5, 1998.

* cited by examiner

Primary Examiner—Christopher Verdier
(74) Attorney, Agent, or Firm—F. Lindsey Scott; Patrick Kim

(57) ABSTRACT

An axial compressor apparatus and a method for reducing the amount of a bearing lubricant passed into the inlet air to the axial compressor by the use of a brush seal between a shaft bearing supporting a shaft axially positioned in the axial compressor and having a rotor downstream relative to air flow through the axial compressor from the brush seal with the brush seal being in contact with the shaft to reduce the passage of the bearing lubricant past the brush seal and into the inlet air.

23 Claims, 4 Drawing Sheets

METHOD AND APPARATUS FOR REDUCING CONTAMINATION IN AN AXIAL COMPRESSOR

This application is a continuation-in-part of U.S. Ser. No. 09/557,280 of the same titled filed Apr. 24, 2000 by Steve Ingistov, now abandoned.

FIELD OF THE INVENTION

This invention relates to an apparatus and method for operating an axial compressor so that the contamination on the blades of the compressor is reduced.

BACKGROUND OF THE INVENTION

Axial compressors are well known to those skilled in the art and are used to compress a variety of gases. One large application of axial compressors is the compression of air for use in turbines used for the generation of electricity and the like. Such compressors typically comprise an outer shell carrying on its inner surface a plurality of rows of stator blades, which are positioned to cause the air to flow generally linearly through the compressor. These stator blades cooperate with rotor blades positioned on the outside of a rotor co-axially positioned inside the shell. The air enters a compressor inlet and is compressed in the compressor and discharged at a compression outlet. Such compressors typically include a suction cone positioned near the compressor inlet and co-axially with the outer shell and the rotor and including a shaft support which generally comprises a bearing housing and a bearing for supporting the shaft which drives the rotor and is powered by any convenient source. The rotor blades are positioned to urge air generally linearly through the axial compressor and function in combination with the stator blades as ell known to those skilled in the art.

The art has long recognized that contamination of the rotor blades reduces the efficiency of axial compressors substantially. An article, "Glass Turbine Compressors Washing State of the Art—Field Experience" by Jean Pierre Stalter, published by the American Society of Mechanical Engineers in 1998, discusses this problem at some length. The article states that, "The geographic area, the climate condition and the geographical plant location and its surrounding environment are major factors which are influencing compressor fouling." The article then discusses various techniques for removing contamination from the stator and rotor blades. Various other attempts have been made to minimize contamination of the stator and rotor blades. The attempts have included filtering the inlet air, cooling the inlet air with water sprays and the like. None of these efforts have been completely successful.

As a result, a continuing effort has been directed toward the development of a method for reducing contamination in axial compressors and particularly on the rotor and stator blades of axial compressors.

SUMMARY OF THE INVENTION

It is now been found that a major source of this contamination is within the compressor itself. More particularly, it has been observed that the lubricant for the bearings supporting the shaft of the axial compressor in many instances is drawn into the compressor where the lubricant becomes a substantial contaminant on the stator blades and rotor blades.

This contamination is greatly reduced by the use of an axial compressor comprising: an outer shell having an inlet and inside and a plurality of rows of stator blades positioned on its inside; a rotor rotatably and co-axially positioned in the outer shell and having an inlet and an outside and a plurality of rows of rotor blades positioned on its outside; a shaft co-axially positioned through the outer shell and the rotor; a suction cone positioned co-axially with the outer shell and the rotor and including a shaft bearing housing containing a shaft bearing rotatably supporting the shaft, the bearing housing having a bearing lubricant inlet; and, a brush seal positioned in at least one of the suction cone or the bearing housing between the bearing and the rotor and in contact with the shaft to reduce the passage of a bearing lubricant past the brush seal toward the rotor.

The invention further comprises a method for reducing the passage of bearing lubricant into the inlet air to an axial compressor comprising: an outer shell having an inlet and inside and a plurality of rows of stator blades positioned on its inside; a rotor rotatably and co-axially positioned in the outer shell and having an inlet and an outside and a plurality of rows of rotor blades positioned on its outside; a shaft co-axially positioned through the outer shell and the rotor; a suction cone positioned co-axially with the outer shell and the rotor and including a shaft bearing housing containing a shaft bearing rotatably supporting the shaft, the bearing housing having a bearing lubricant inlet, by positioning a brush seal between the bearing and the rotor and in contact with the shaft to reduce the passage of a bearing lubricant past the brush seal toward the rotor.

The invention further comprises a method for reducing contamination on axial compressor blades, the compressor comprising: an outer shell having an inlet and inside and a plurality of rows of stator blades positioned in its inside; a rotor rotatably and co-axially positioned in the outer shell and having an inlet and an outside and a plurality of rows of rotor blades positioned on its outside; a shaft co-axially positioned through the outer shell and the rotor; a suction cone positioned co-axially with the outer shell and the rotor and including a shaft bearing housing containing a shaft bearing rotatably supporting the shaft, the bearing housing having a bearing lubricant inlet, the method comprising positioning a brush seal between the bearing and the rotor to reduce the passage of a bearing lubricant past the brush seal toward the rotor and into an inlet air stream to the compressor.

The invention further comprises an axial compressor having an inlet and an outlet, at least one rotary shaft and at least one shaft bearing housed in a non-rotary shaft bearing housing including an oil supply for the bearing, a brush seal supported by the shaft bearing housing and in contact with the outside of the shaft to reduce the loss of oil from the shaft bearing housing along the shaft.

The invention further comprises a labyrinth seal positioned on the bearing housing to reduce the passage of a bearing lubricant and air past the labyrinth seal toward the brush seal. The labyrinth seal desirably contains at least one drain to drain accumulated bearing lubricant from the labyrinth seal back into the bearing housing.

The present invention further comprises the use of a plurality of brush seals positioned on at least one of the suction cone or the bearing housing between the bearing and the rotor and in contact with the shaft to reduce the passage of a bearing lubricant or air past the brush seals towards the rotor.

DESCRIPTION OF PREFERRED EMBODIMENTS

In the discussion of the Figures, the same numbers will be used throughout to refer to the same or similar components. Further, only those components of the compressor necessary for the description of the invention have been shown and discussed for conciseness.

Figure 1:
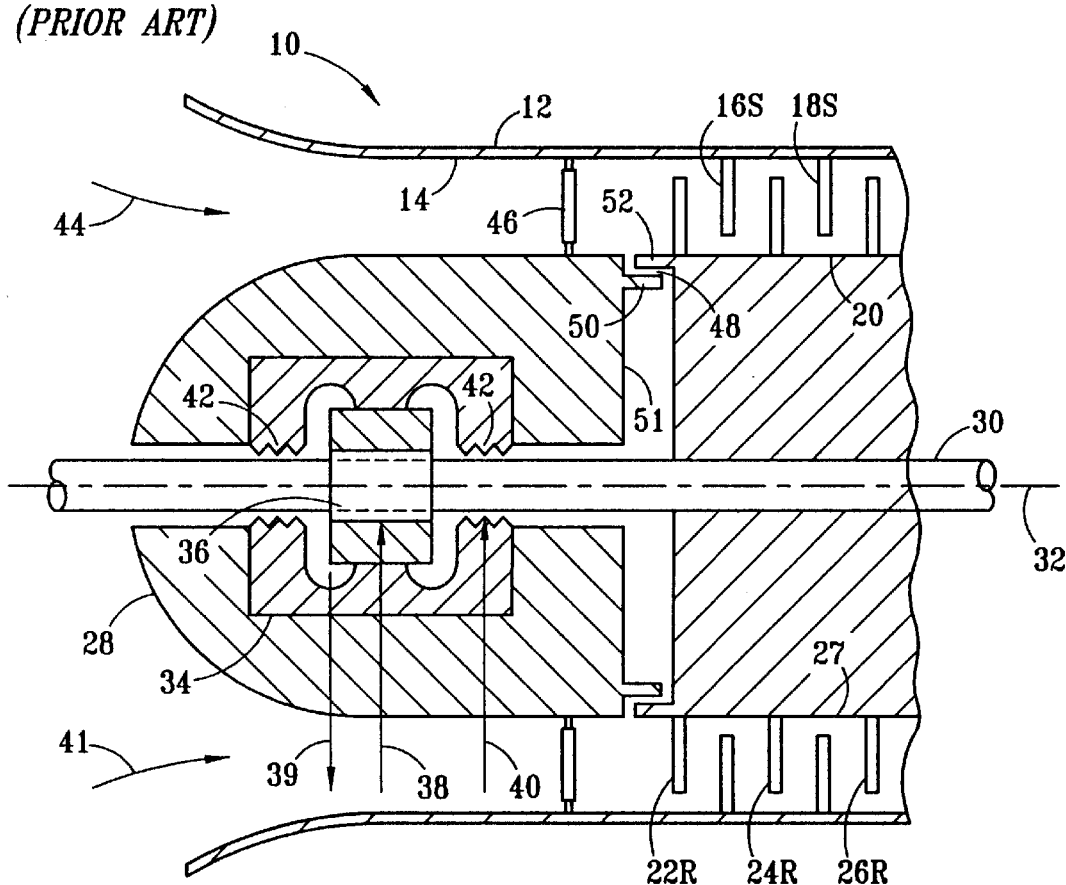
FIG. 1 is a schematic cross-sectional view of the inlet end of a prior art axial compressor.

In FIG. 1, an inlet section of an inlet end of an axial compressor 10 is shown. Axial compressor 10 comprises an outer shell 12 having an inside 14. A plurality of stator blades, a portion of which are shown as 16S and 18S are mounted in rows on the inside 14 of outer shell 12. A rotor 20 which is shown for convenience as a solid member, but which in fact is generally hollow of a fabricated construction sufficient to support a plurality of rotor blades shown as 22R, 24R and 26R on an outside 27 of rotor 20, is co-axially positioned in outer shell 12 and 20. Rotor 20 is rotatably driven by shaft 30. Shaft 30 extends through rotor 20 and is supported in a suction cone 28. Suction cone 28 is a non-rotary member and includes a bearing housing, including a bearing 36 for supporting shaft 30. Shaft 30 is co-axially positioned through suction cone 28, outer shell 12 and rotor 20 and has a centerline shown as 32. Bearing 36 is positioned in bearing housing 34 and is provided with a bearing lubricant supply generally shown by a line and arrow 38. This bearing lubricant supply may be supplied at one, or a plurality of locations around bearing 36. A bearing lubricant recovery line is shown generally by an arrow 39. The use of such lines to supply and recover bearing lubricant from a bearing is considered to be well known in the art and will not be discussed further. The bearing lubricant, also referred to herein as oil, is supplied in rather copious quantities to bearing 36 and because of the rapid rotation of shaft 30 during compressor operation, is whipped into a fine mist inside bearing housing 34. In conventional designs, the escape of air containing a fine mist of oil from inside bearing housing 34 is inhibited by labyrinth seals 42 (shown in FIG. 2), which are positioned around shaft 30 at each end of bearing housing 34. Labyrinth seals of this type are frequently used as a seal between rotary and non-rotary parts. Unfortunately, the labyrinth seals do not contact the rotary member because of wear and other concerns. As a result, a buffering air supply 40 is supplied at a plurality of locations around the labyrinth and end of bearing housing 34 between the bearing and rotor 20. A portion of air as injected tends to flow into the space between suction cone 28 and shaft 30. This air is designed to function to prevent the escape of air bearing lubricant mist from the bearing housing, past the labyrinth seal and into a space between suction cone 28 and rotor 20 as shown by an arrow 62 in FIG. 2. This buffering air is typically drawn from a downstream source of compressed air produced by the compressor.

While not shown, a second shaft bearing is typically positioned near a compressor outlet or downstream from the compressor outlet as shown for instance in U.S. Pat. No. 5,961,279. Brush seals as disclosed herein may also be used to prevent the loss of oil or bearing lubricant from such bearings.

In FIG. 1, an inlet guide vein 46 is shown positioned between the inside 14 of outer shell 12 and outside 27 of suction cone 28. The inlet guide veins are designed to smooth the flow of air into compressor 10. As air is drawn into compressor 10 as shown by arrows 44, a vacuum, on the order of ten to twenty inches of water or the like, is created at the compressor inlet. As a result of the suction of inlet air and the increase in the velocity of the air at an opening 48 between rotor 20 and an end 51 of suction cone 28, a substantial vacuum which may be on the order of about 20 inches of water, is created. This opening 48 is formed by a gap between a non-rotary extension 50 on suction cone 28 and an overlapping extension 52 on rotor 20. The suction on opening 48 may thus be sufficient to cause the flow of oily air bearing entrained lubricant from inside bearing housing 34 outwardly through opening 48 and into contact with the rotor blades and stator blades. This is a substantial source of contamination of these blades and can result in a substantial loss of efficiency in the compressor.

Figure 2:
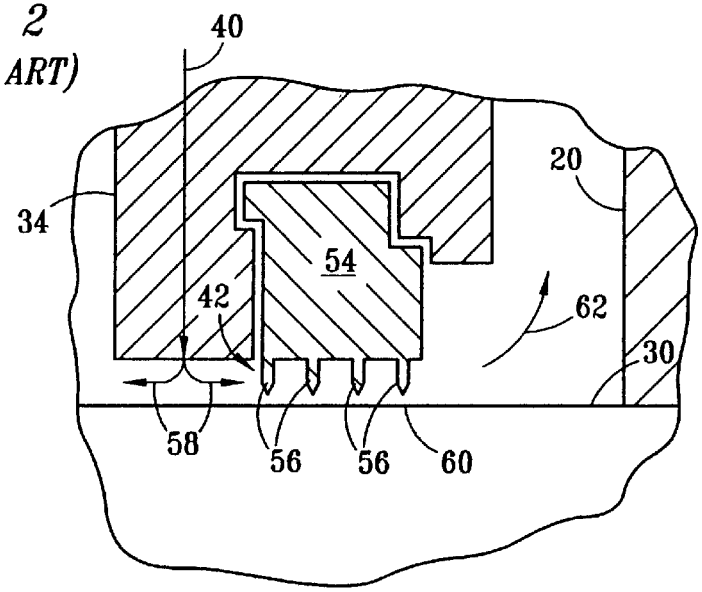
FIG. 2 is an enlarged cross-sectional schematic view of a labyrinth seal positioned in the prior art compressor.

FIG. 2, an enlarged view of one of the labyrinth seals is shown. The labyrinth seal is positioned in a ring 54, which is desirably positioned in a shaped slot in suction cone 28 which suction 28 is disassembled to service bearing 36 and the like. Normally members such as suction cone 28 are formed as a plurality of sections which are readily disassembled to disassemble bearing housing 34 and service bearing 36 and the like. Also it should be noted that while suction cone 28 is shown as a solid member, it is generally not solid but is fabricated to fulfill its required function of covering bearing housing 34 and providing support for shaft 30. When suction cone 28 is so disassembled, a labyrinth seal is readily positioned as either one ring or as a plurality of ring sections, so that when suction cone 28 is reassembled a labyrinth seal as shown in FIG. 2 is positioned around shaft 30. Such seals as noted above have been supplemented with air injection between the labyrinth seal and bearing housing 34 in an attempt to create a flow of air back toward bearing 36 so that lubricant mist and the like are directed away from labyrinth seals 42. Labyrinth seal 42 as shown includes a ring 54 configured to fit in a shaped slot, which carries a plurality of labyrinth extensions 56. These extensions are typically knife-edge extensions, which are designed to extend toward, not but engage shaft 30. Engagement of these members with shaft 30 tends to result in wearing away of either a portion of shaft 30 or a portion of the labyrinth extensions to the detriment of the ability to inhibit flow along shaft 30. As noted previously, airflow provided by the buffer air is directed both through labyrinth seal 42 and back toward bearing 36. As shown, the air passing past labyrinth seal 42 flows upwardly as shown by arrow 62. As indicated previously, a considerable quantity of lubricant mist is carried by shaft pumping action past labyrinth seal 42 by air by entrainment and outwardly as shown by arrow 62 to ultimate contact with the rotor blades and stator blades. This can result in substantial contamination of these blades.

As noted previously in the articles entitled "Gas Turbine Compressor Washing—State of Art—Field Experiences," it has previously been believed that as noted in the article, "The geographical area, the climatic condition and the geological plant location and its surrounding environment are major factors, which are influencing compressor fouling." It has now been found by the Applicants that a major source of rotor blade and stator blade contamination which is much more significant than any of the factors mentioned in the article, is the lubricant mist contamination generated in the compressor itself.

Figure 3:
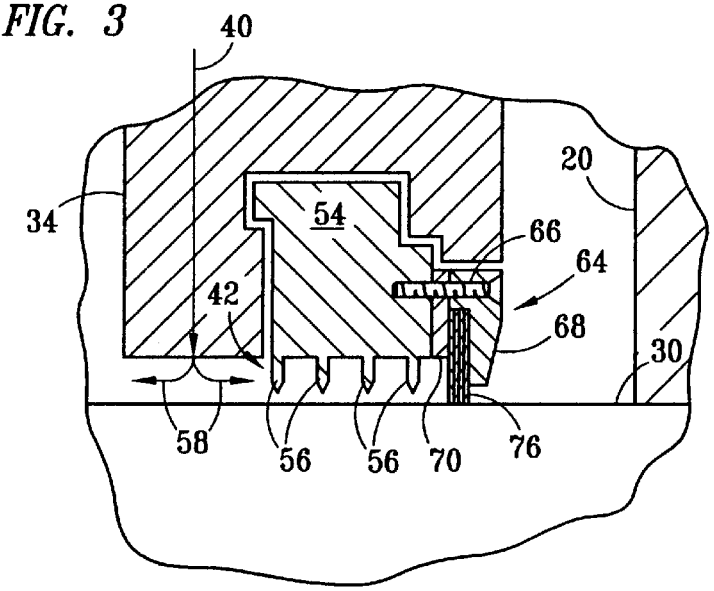
FIG. 3 is a similar cross-sectional view of the labyrinth seal and the brush seal of the present invention in the area of the labyrinth seal of an axial compressor; and, FIG. 4 is an enlarged view showing the brush seal shown in FIG. 3.
Figure 5:
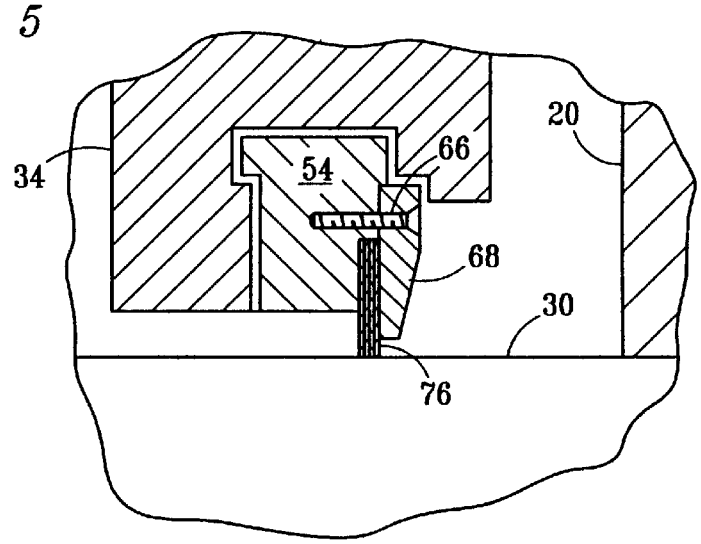
FIG. 5 shows an alternate embodiment of the brush seal.

In FIG. 3, the brush seal of the present invention is shown. This brush seal as shown is positioned on the ring 54, which bears a labyrinth seal. It will be understood that this brush could be positioned at a variety of other locations, as shown for instance in FIG. 5. For instance, if no labyrinth seal was used, it could be positioned against the face of the bearing housing, which formerly supported ring 54. It could also be positioned on an outer edge of ring 54 without a labyrinth seal as shown in FIG. 5. A variety of other configurations could be used provided that brush seal 64 is positioned to contact shaft 30 substantially around its entire diameter. Brush seal 64 as shown comprises a back plate 68 which is positioned downstream with respect to the flow along shaft 30 with a front plate 70 being positioned upstream with respect to the flow along shaft 30. A screw 66 is shown positioned to hold the brush seal in place. This brush seal is desirably formed as a ring and is installed as discussed previously with respect to the labyrinth seal. Such methods of installing ring seal or labyrinth members are considered to be well known to those skilled in the art and will not be discussed in detail.

Figure 4:
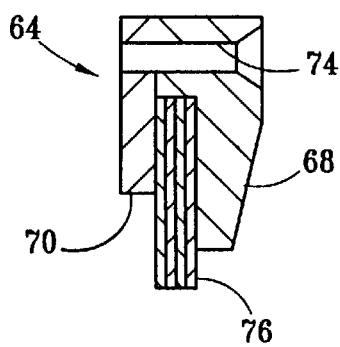

In a preferred embodiment of the brush seal shown in FIG. 4, it is desirable that back plate 68 be somewhat more extended than front plate 70. While a screw opening 74 is shown for fixing brush seal 64 in place, it should be clearly understood that a variety of other techniques could be used such as the configuration of brush seal 64 as a ring which can be slideably mounted in a recess positioned around the inside of bearing housing 34 and the like, for instance as shown for ring 54 supporting labyrinth extensions 56.

Brush seal 64 is desirably fabricated of a relatively soft flexible material and may comprise metal bristles or plastic or other organic bristles. Desirably in either case, the bristles are either fabricated of or coated with a lubricant repellant material such as Teflon or nylon. It is desired that the brush seal not retain lubricant which is impeded in its passage along the outer diameter or shaft 30. Rather it is preferred that this lubricant be intercepted and ultimately returned to the inside of bearing housing 34 for return via line 39. It is desired, however, that the bristles be formed of a suitable hardness so that they may contact shaft 30 without damage to shaft 30. Desirably the bristles of brush seal 64 may be formed of a lubricant repellant material such as Teflon, nylon or the like. The bristles need to retain their rigidity during operation of compressor 10. The bristles as noted should be of a consistency such that they can contact the outside of shaft 30 and desirably of sufficient density in the brush seal to inhibit the passage of lubricant mist through the bristles. Desirably at least 70% and preferably 90 to 95% of the lubricant is stopped by brush seal 64 and ultimately passes back along shaft 30 into bearing housing 34. Desirably a significant portion of the air in bearing housing 34 is permitted to pass through brush seal 64 and upwardly through opening 48 and into compressor 10. While the use buffer air with the brush seal is optional, the use of buffer air is shown in FIG. 3 in conjunction with the use of brush seal 64. The buffer air in this instance is primarily directed to the inside of bearing housing 34, although some air passes through labyrinth seal 42 and eventually through brush seal 64. Desirably lubricant is stopped by brush seal 64 and passes back along shaft 30 and into the inside of bearing housing 34.

Figure 6:
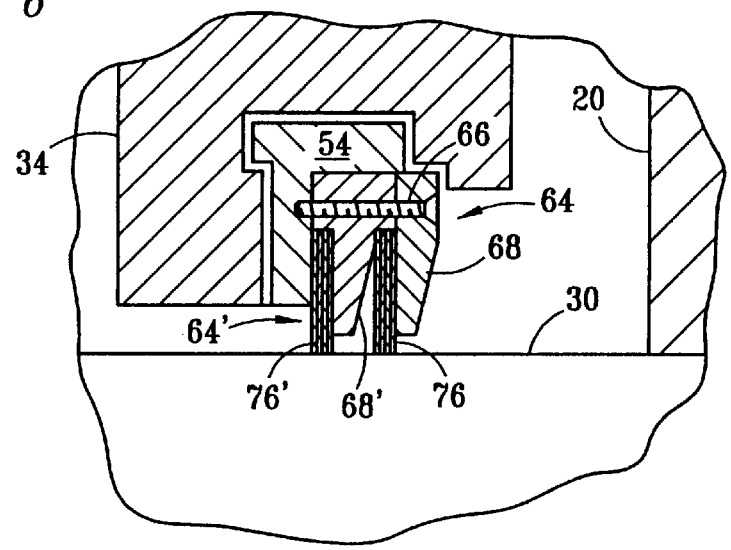
FIG. 6 shows an alternate embodiment of the brush seal.

While a single brush seal may be used without a labyrinth seal as shown in FIG. 5 it is desirable when no labyrinth seal is used that at least two brushes be used as shown in FIG. 6 as brushes 64 and 64'. Three or more brushes may also be used if desired. While a single brush is sufficient to stop a significant portion of the oil, much better results are obtained when two or more brushes are used. The oil stopped by brushes 64 and 64' is returned along the length of shaft 30 back into bearing housing 34 for ultimate recovery through line 39.

Figure 7:
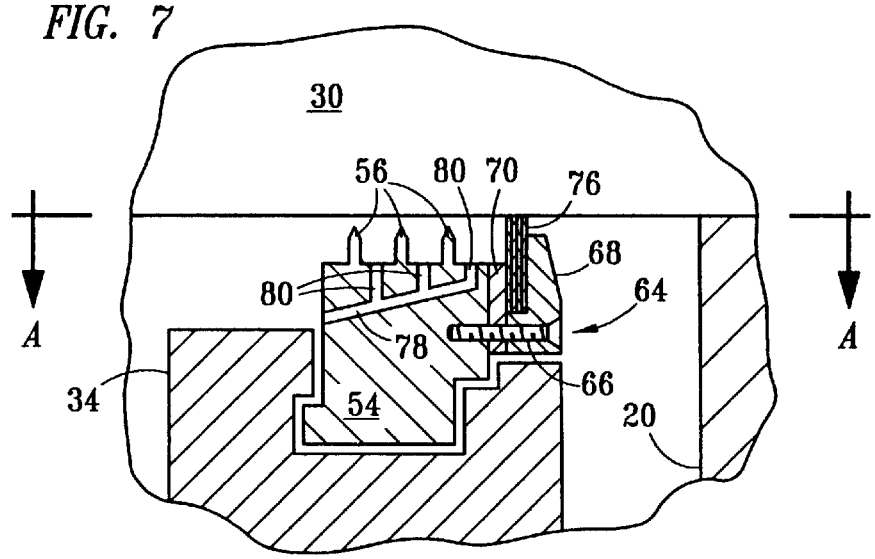
FIG. 7 is a cross-sectional view of the labyrinth seal and the brush seal of the present invention with an oil drain.

When a labyrinth seal is used in conjunction with the brush seal as shown for instance in FIG. 3 it may be desirable to provide a drain from the labyrinth seal to facilitate the return of the oil stopped by brush 64 back into bearing housing 34. Such a drain 78 is shown in FIG. 7. In the embodiment shown in FIG. 7 a drain 78 is positioned to drain oil from between each of the pairs of labyrinth seal extensions 56 and the last labyrinth seal extension 56 and brush 64. The drain is in fluid communication with a plurality of holes 80 positioned at each of these locations to permit the flow of oil outwardly away from shaft 30 and into drain 78 which is slanted to extend outwardly from shaft 30 as it extends toward bearing housing 34. This facilitates the flow of oil stopped by both the labyrinth seal and the brush seal from accumulating along shaft 30 between brush 64 and bearing housing 34. The accumulation of oil in this area can cause numerous problems and it is desirably removed after it has been stopped by removal from the oil mist and the like. The oil drained from passageway 78 is returned to bearing housing 34 as shown. While not shown a similar drain may be used to drain oil from the space between brushes 64 and 64' in the embodiment shown in FIG. 6.

Figure 8:
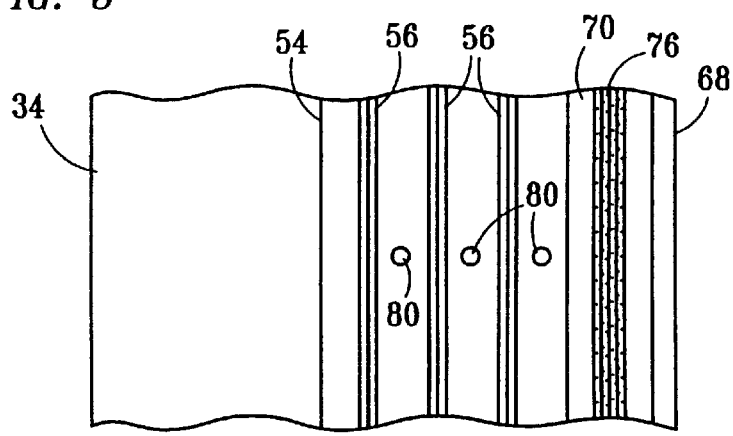
FIG. 8 is a top view of the embodiment of FIG. 7.

In FIG. 8 a top view of a section of ring 54 of this embodiment taken along line AA is shown. The holes 80 between each of the labyrinth seal extensions and the last labyrinth seal extension and the brush are shown.

Figure 9:
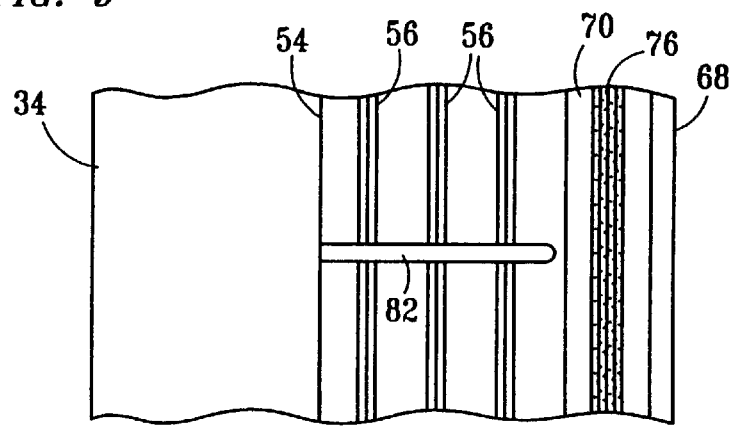
FIG. 9 shows an alternate embodiment of an oil drain.

In FIG. 9 an alternate embodiment is shown wherein a slot 82 is cut to extend through each of the labyrinth seal extensions 56 so that a drain is provided from the space between the last labyrinth seal extension and the brush seal through the labyrinth seal extensions to permit the drainage of oil from these areas into bearing housing 34.

Figure 10:
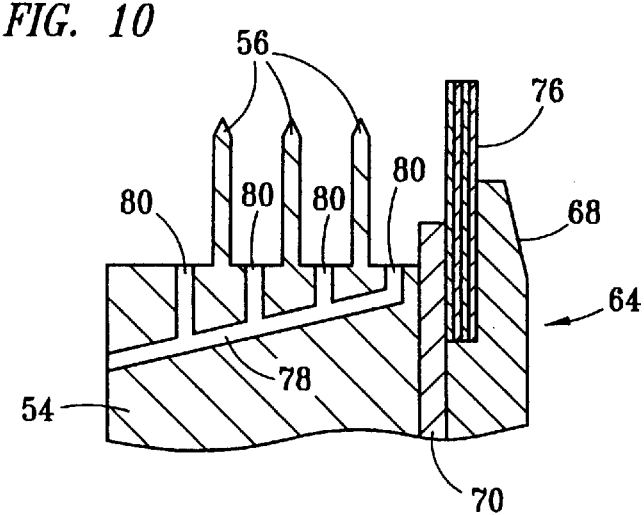
FIG. 10 is an expanded view of the oil drain of FIG. 7.

In FIG. 10 an enlarged view of the drain 78 is shown. A hole may also be positioned upstream from the last upstream labyrinth seal extension 56 as shown.

Figure 11:
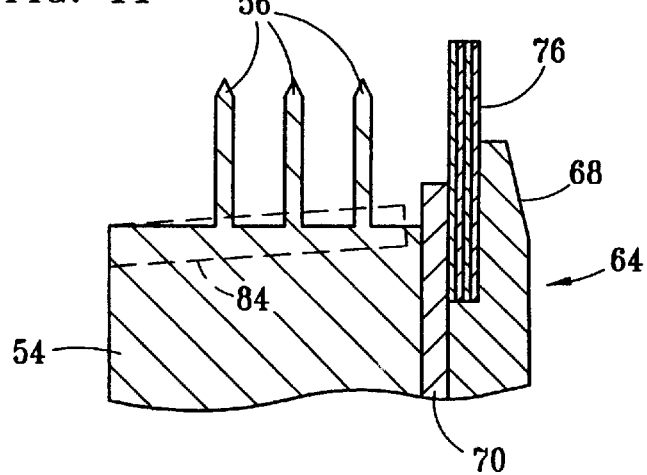
FIG. 11 shows an alternate embodiment of an oil drain.

In FIG. 11 a further embodiment is shown. In this embodiment a bore 84 is positioned through ring 54 to extend inwardly from an upstream end of ring 54 so that an inner end of bore 84 near brush seal 76 is open to receive and drain oil from this space. Bore 84 is also open between labyrinth seal extensions 56 so that oil is also drained from between these extensions.

The drain for the oil may assume a variety of configurations. Desirably the configuration is not such as to weaken ring 54 or labyrinth seal extensions 56 unduly. For instance the embodiment shown in FIG. 9 is considered to weaken the labyrinth seal extensions more than either of the other embodiments. The embodiment shown in FIG. 7 is a preferred embodiment. One or a plurality of drains may be positioned as considered desirable to return the oil stopped by brush 64 to bearing housing 34. Drain 78 is positioned to drain oil outwardly with respect to shaft 30. The outlet end of drain 70 is positioned further from shaft 30 than any of the inlet ends to drain 78.

The purge air referred to previously is supplied to divert a major quantity of the oil mist produced in bearing housing 34 out of bearing housing 34 or at least away from labyrinth seal 42. This air constitutes a substantial volume of air contaminated with quantities of an oil mist. The air is supplied from the compressor output of compressed air. This air must be treated for the removal of the oil mist and constitutes lost air production from the compressor. In other words the air required for injection into bearing housing 34 as purge air could be produced as a part of the product air stream from the air compressor if not required as purge air. This constitutes a significant loss of compressed air product. According to the present invention with the use of the brush seal and the labyrinth seal or with the brush seal alone it is considered that the use of the purge air can be greatly reduced i.e., reduced by from about 50 to about 75%, or eliminated entirely because of the greater oil removal efficiency of the brush seals. This constitutes a substantial savings in air treatment cost and a substantial increase in the volume of compressed air produced by the compressor. This saving and increase in produced compressed air volume is achieved at the same time that the pollution of the compressor blades is reduced and the oil losses are reduced. According to the present invention a significant improvement in the operation of axial compressors has been achieved.

The present invention comprises an axial compressor, including a brush seal and a method for reducing contamination on axial compressor blades by positioning the brush seal between the bearing and the rotor to reduce the passage of bearing lubricant past the brush seal toward the rotor and into the inlet stream into the compressor. The invention further comprises a method for reducing the passage of bearing lubricant into the inlet air to the compressor by positioning a brush seal between the bearing and the rotor and in contact with the shaft to reduce the passage of the bearing lubricant past the brush seal toward the rotor. The elimination of the lubricant contamination of the blades in compressor 10 eliminates the presence of a film of lubricant on the blades which enables the accumulation of dust and other finely divided particulates in the air compressed in the compressor on the blades. This contamination results in a substantial loss of efficiency in the compressor and its elimination is very beneficial to improved compressor efficiency. The method of the present invention has enabled the operation of axial compressors in a more efficient fashion by reducing the amount of contamination on the blades resulting from operation of the compressor itself.

It should be noted that not only the bristles of brush seal 64, but the ring materials also maybe fabricated from various plastic materials. So long as these materials possess sufficient strength to retain the brush seal in position they may be used. Other materials are metals and the like conventionally used for the formation of labyrinth seals and the like.

Having thus described the present invention by reference to certain of its preferred embodiments, it is pointed out that the embodiments discussed are illustrative rather than limiting in nature and that many variations and modifications are possible within the scope of the present invention.

Having thus described the invention, we claim:

1. An axial compressor comprising:
   (a) an outer shell having an inlet, an outlet, and an inside and a plurality of rows of stator blades positioned in its inside;
   (b) a rotor rotatably and co-axially positioned in the outer shell and having an outside and a plurality of rows of rotor blades positioned on its outside;
   (c) a shaft co-axially positioned through the outer shell and the rotor;
   (d) a suction cone positioned co-axially with the outer shell and the rotor and including a shaft bearing housing containing a shaft bearing rotatably supporting the shaft, the bearing housing having a bearing lubricant inlet and a labyrinth seal between the bearing and the rotor; and,
   (e) a brush seal positioned in the suction cone or the bearing housing between the labyrinth seal and the rotor and in contact with the shaft to reduce the passage of a bearing lubricant past the brush seal toward the rotor.

2. The compressor of claim 1 wherein the bearing housing includes a bearing lubricant recovery line.

3. The compressor of claim 1 wherein the brush seal comprises bristles retained between a front plate and a back plate which form a ring mountable around the bearing housing.

4. The compressor of claim 3 wherein the bristles comprise a lubricant-repellant material.

5. The compressor of claim 4 wherein the bristles are of metallic material coated with a lubricant-repellant coating.

6. The compressor of claim 5 wherein the bearing lubricant repellant coating is a bearing lubricant repellant plastic.

7. The compressor of claim 6 wherein the bearing lubricant repellant plastic is nylon or Teflon.

8. The compressor of claim 5 wherein the bristles are of a bearing lubricant repellant plastic.

9. The compressor of claim 8 wherein the bristles are of nylon or Teflon.

10. The compressor of claim 1 wherein the labyrinth seal is positioned on a supporting ring positioned on the suction cone or the bearing housing and wherein the supporting ring includes a bearing lubricant drain to drain bearing lubricant from the labyrinth seal.

11. The compressor of claim 1 wherein a bearing lubricant drain is positioned through at least a portion of the labyrinth to drain bearing lubricant from at least one of the brush seal and the labyrinth into the bearing housing.

12. A method for lubricating a shaft bearing rotatably engaging a shaft and reducing the passage of bearing lubricant into inlet air to an axial compressor comprising an outer shell having an inlet and an inside and a plurality of rows of stator blades positioned on its inside; a rotor rotatably and co-axially positioned in the outer shell and having an outside and a plurality of rows of rotor blades positioned on its outside; the shaft being co-axially positioned through the outer shell and the rotor; and, a suction cone positioned co-axially with the outer shell and the rotor and including a shaft bearing housing containing the shaft bearing rotatably supporting the shaft, the bearing housing having a bearing lubricant inlet, the suction cone including a labyrinth seal between the bearing and the rotor, the method comprising:
   a) passing the bearing lubricant to the bearing;
   b) passing compressed air into the bearing housing;
   c) recovering excess lubricant from the bearing housing;
   d) discharging oil-mist laden air from the bearing housing; and,
   e) positioning a brush seal between the labyrinth seal and the rotor and in contact with the shaft to reduce the passage of the bearing lubricant past the brush seal toward the rotor.

13. The method of claim 12 wherein the brush seal comprises bearing lubricant repellant bristles.

14. The method of claim 13 wherein the brush seal is in contact with the shaft.

15. The method of claim 14 wherein the brush seal reduces the passage of bearing lubricant along the shaft from the bearing housing toward the rotor by at least 70 percent.

16. The method of claim 15 wherein the brush seal permits the passage of air through the brush seal toward the rotor.

17. The method of claim 12 wherein bearing lubricant is drained from at least one of the brush seal and the labyrinth seal into the bearing housing.

18. A method for reducing contamination on axial compressor blades, in an axial compressor comprising: an outer shell having an inlet and an inside and a plurality of rows of stator blades positioned on its inside; a rotor rotatably and co-axially positioned in the outer shell and having an outside and a plurality of rows of rotor blades positioned on its outside; a shaft co-axially positioned through the outer shell and the rotor; a suction cone positioned co-axially with the outer shell and the rotor and including a shaft bearing housing containing a shaft bearing rotatably supporting the shaft, the suction cone having a bearing lubricant inlet; a labyrinth seal, the labyrinth seal being positioned in the suction cone or the bearing, the rotor and a brush seal in contact with the shaft to reduce the passage of a bearing lubricant past the brush seal toward the rotor, the method comprising positioning the brush seal between the labyrinth seal and the rotor to reduce the passage of the bearing lubricant past the brush seal toward the rotor and into an inlet air stream to the compressor.

19. The method of claim 18 wherein the brush seal is in contact with the shaft.

20. The method of claim 19 wherein the bristles of the brush seal comprise a bearing lubricant repellant material, wherein the bristles are in contact with the shaft, wherein the brush seal reduces the passage of the bearing lubricant past the seal and toward the rotor by at least 70 percent, and wherein the seal permits the passage of air through the brush seal toward the rotor.

21. The method of claim 18 wherein the labyrinth seal is positioned between the brush seal and the bearing and wherein bearing lubricant is drained from at least one of the brush seal and the labyrinth seal into the bearing housing.

22. An axial compressor comprising:
    (a) an outer shell having an inlet and an inside and a plurality of rows of stator blades positioned in its inside;
    (b) a rotor rotatably and co-axially positioned in the outer shell and having an outside and a plurality of rows of rotor blades positioned on its outside;
    (c) a shaft co-axially positioned through the outer shell and the rotor;
    (d) a suction cone positioned co-axially with the outer shell and the rotor and including a shaft bearing housing containing a shaft bearing rotatably supporting the shaft, the bearing housing having a bearing lubricant inlet; and,
    (e) a brush seal positioned in the suction cone or the bearing housing between the bearing and the rotor and in contact with the shaft to reduce the passage of a bearing lubricant past the brush seal toward the rotor.

23. The compressor of claim 22 wherein the bearing housing includes a bearing lubricant recovery line.

* * * * *

UNITED STATES PATENT AND TRADEMARK OFFICE
CERTIFICATE OF CORRECTION

PATENT NO. : 6,609,888 B1 Page 1 of 1
DATED : August 26, 2003
INVENTOR(S) : Steve Ingistov It is certified that error appears in the above-identified patent and that said Letters Patent is hereby corrected as shown below:

Column 8,
Line 28, "The compressor of claim 5" should read -- The compressor of claim 3 --

Signed and Sealed this

Eleventh Day of November, 2003

JAMES E. ROGAN
*Director of the United States Patent and Trademark Office*